Dec. 6, 1960     T. W. BONNER ET AL     2,963,582
NEUTRON PRODUCTION THROUGH ALPHA
DISINTEGRATION OF CARBON 13
Filed Nov. 8, 1954
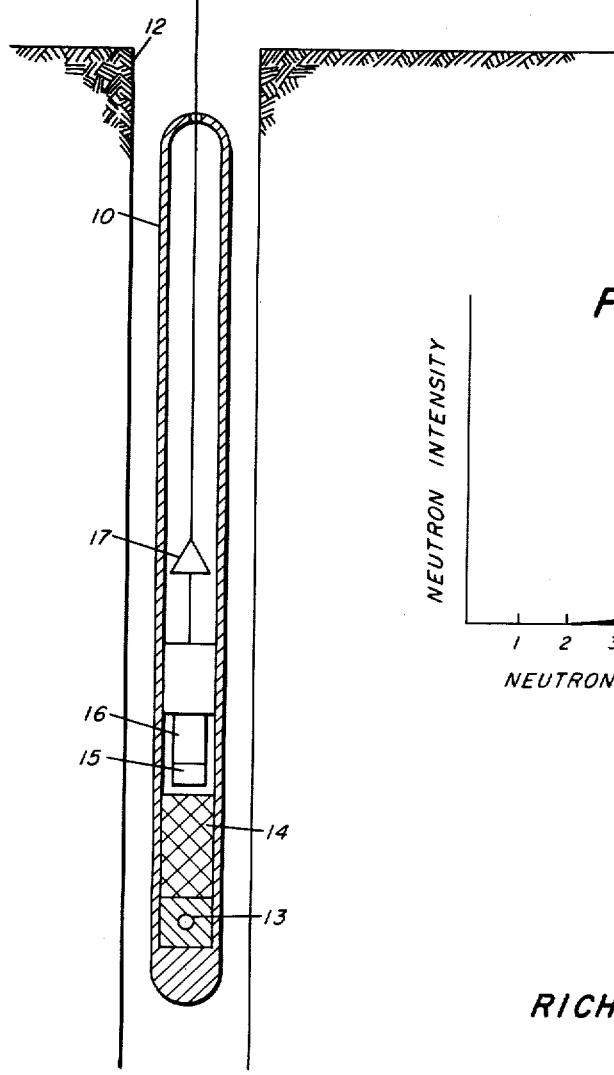
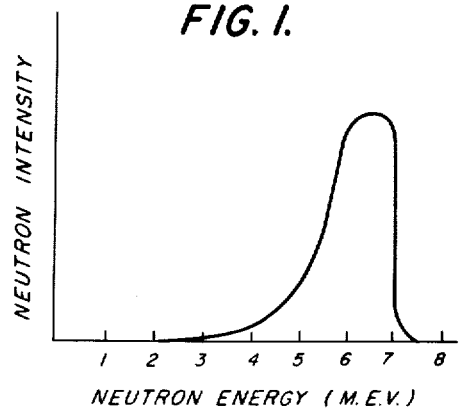
TOM W. BONNER
RICHARD L. CALDWELL
INVENTORS
BY *D. Carl Richards*
ATTORNEY

United States Patent Office

2,963,582
Patented Dec. 6, 1960

2,963,582

NEUTRON PRODUCTION THROUGH ALPHA DISINTEGRATION OF CARBON 13

Tom W. Bonner, Houston, and Richard L. Caldwell, Dallas, Tex., assignors, by mesne assignments, to Socony Mobil Oil Company, Inc., New York, N.Y., a corporation of New York Filed Nov. 8, 1954, Ser. No. 467,319

5 Claims. (Cl. 250—83.3)

This invention relates to the production and use of substantially monoenergetic neutrons substantially free from gamma radiation. In a more specific aspect, the invention relates to the bombardment of $_6C^{13}$ with alpha rays for the production of neutrons. In a further specific aspect, the invention relates to the bombardment of earth formations surrounding a drill hole by neutrons produced by disintegration of $_6C^{13}$ and detecting prompt gamma radiation in a specific energy band for determination of the concentration of carbon in such formations.

A neutron emitter dependent upon disintegration of beryllium through bombardment with an alpha rayer is extensively used in radioactive well logging. However, certain unwanted gamma-rays flow from conventional sources such as radium-beryllium and polonium-beryllium. Radium-beryllium, for example, while emitting neutrons in the range of from 2 to 11 m.e.v. also emits a high intensity of both soft and hard gamma-rays. In certain well logging operations and other analyses the attendant gamma radiation is such as to obscure desired measurements. While a polonium-beryllium source is characterized by a much more favorable ratio of neutrons to gamma radiation, the characteristic high intensity of low energy neutrons often is intolerable because such neutrons are readily moderated and then upon capture produce hard gamma radiation which makes a resulting log ambiguous.

The present invention is based upon the provision of a capsuled neutron source wherein a substantial portion of the neutrons lies within a relatively narrow high energy band. More particularly in accordance with the present invention, there is provided a high energy substantially gamma-free neutron source particularly adapted for use in well logging comprising an alpha rayer and a target material formed of $_6C^{13}$. In a further aspect of the invention, there is provided a source of radiation for well logging in which a capsule of selected quantity of an alpha rayer and $_6C^{13}$ are intimately mixed and supported for movement along a well bore. In a further aspect, there is provided a method of well logging the carbon content of earth formations adjacent a borehole by bombardment with neutrons generated by disintegration of $_6C^{13}$ with alpha rays. Prompt gamma radiation in the region of about 4.4 m.e.v. produced by neutron bombardment of the carbon in the formations is detected and recorded in correlation with the depth of such formations.

For a further understanding of the present invention, reference may now be had to the following description taken in conjunction with the accompanying drawings in which:

Fig. 1 illustrates the energy distribution of neutrons emitted by alpha-ray disintegration of $_6C^{13}$; and Fig. 2 illustrates a well logging system suitable for carrying out the present invention.

The present invention is based upon the existence of a unique energy distribution of neutrons produced upon bombardment of carbon 13 with alpha rays. In accordance with the present invention, a selected quantity of carbon highly enriched in the isotope $_6C^{13}$ is intimately mixed with an alpha rayer such as polonium having alpha rays of energy of about 5.3 m.e.v. or plutonium having alpha rays of energy of about 5.1 m.e.v. The resultant mixture is encapsuled preferably in a sealed metallic housing. As shown in Fig. 1, the neutron flux produced from such alpha bombardment of $_6C^{13}$ has maximum intensity in the energy range of from about 5 to 7 m.e.v. The encapsuled source may be prepared as well understood by those skilled in the art to provide a neutron source unique in its high energy properties unencumbered by intolerable intensities of high energy gamma radiation.

In another aspect, the invention relates to measurement of an important constituent of earth formations. More particularly, it has been found that neutrons of an energy of about 4.8 m.e.v. or greater are necessary to excite gamma radiation in carbon at an energy level that has been measured to be 4.43 m.e.v. Thus excitation of earth formations by gamma-free neutrons having energies of from about 5 to 7 m.e.v. will selectively excite carbon. Detection of resultant gamma radiation provides an indication as to the relative concentrations of carbon along the length of a borehole. Since location of petroleum accumulations and the completion of a well at the depth of such accumulations is a primary problem, a log that may be obtained in either open hole or through casing but which delineates variations in carbon concentration is of great value. The present invention involves the production of such a log in the manner illustrated in Fig. 2. A well logging tool 10 supported by a cable 11 in a borehole 12 includes a capsuled neutron source 13 in which the source is comprised of a target of $_6C^{13}$ and an alpha rayer preferably of the class comprising polonium or plutonium. A shield 14 separates source 13 from a detecting crystal 15. Crystal 15 is positioned adjacent a photomultiplier tube 16 whose output is connected by way of amplifier 17 and cable 11 to the earth's surface.

A measuring circuit 20 is connected between the cable on reel 21 and a recorder 22. A connection 23 is provided between a cable measuring element 24 and recorder 22 to drive a log chart such that its length is proportional to the depth of the unit 10. Measuring circuit 20 preferably is designed to separate pulses of different heights so that the energy of individual gamma rays impinging crystal 15 may be logged. It is desired that unit 20 eliminate from the measurement all gamma radiation pulses except those within a predetermined band or, in the alternative, above a predetermined minimum level.

It has been found that carbon in formations when bombarded with neutrons of sufficient energy emits gamma radiation having an energy of about 4.4 m.e.v. It has further been found that neutrons in the energy range of about 5 to 7 m.e.v. have a particularly high probability for producing this gamma radiation.

A reliable log of carbon content of formations may be secured by bombarding with neutrons produced by alpha particles on $_6C^{13}$ and measuring gamma radiation above about 4 m.e.v. This 4.4 m.e.v. level of excitation of $_6C^{13}$ results from bombardment by neutrons having energies in excess of 4.8 m.e.v. It should be noted that although oxygen which may be present at the site of measurements has an excitation level of 6.13 m.e.v., neutrons having energies of at least 6.6 m.e.v. are required to excite oxygen at this level. Since bombardment of carbon 13 by alpha rays produces neutrons of from 5 to 7 m.e.v., neutrons in excess of 6.6 m.e.v. capable of exciting oxygen would be relatively few in number and thus an integral count of gamma radiation above about 4.0 m.e.v. would depend substantially entirely upon gamma radiation from carbon. If greater definition is desired, a differential count may be made by measuring a relatively narrow band of gamma radiations having energies centered at 4.4 m.e.v. The counting circuit 20 may be of the type well known in the art for determining energy levels of radiation detected by scintillating crystals and the like. By way of example only, Patent No. 2,686,266 to Pringle et al. discloses a suitable circuit for performing measurements.

Among the advantages of the method herein described are absence of excitation of oxygen in the formations; substantially complete absence of slow neutrons so that the presence of salt water or chlorine concentrations does not impair measurements; reduction in the background continuum of radiations by bombarding with neutrons in a relatively narrow band of energies, i.e., fewer nuclei of silicon, calcium and aluminum are excited; and finally and most important, selective excitation of carbon nuclei to give about 4.4 m.e.v. characteristic gamma-rays so that concentrations of carbon such as in petroleum accumulations may be readily detected.

While the invention has been described in connection with certain modifications thereof, further modifications may now suggest themselves to those skilled in the art and it is intended to cover such modifications as fall within the scope of the appended claims.

What is claimed is:

1. The method of logging the carbon content of formations penetrated by a borehole which comprises supporting a quantity of $_6C^{13}$ for movement along the length of a well bore, irradiating said quantity with alpha particles of energy of the order of 5 m.e.v. thereby producing neutrons substantially entirely within the range of from 5 to 7 m.e.v., and detecting prompt gamma radiation in the range of from 4.4 to 6.0 m.e.v. resulting from the neutron bombardment of adjacent formations.

2. The method of logging the carbon content of formations penetrated by a borehole which comprises supporting a capsule comprising an intimate mixture of a target material of $_6C^{13}$ and an alpha rayer producing alpha rays of energies of about 5 m.e.v. for movement along the length of a well bore to irradiate the adjacent formations with neutrons having energies substantially confined to the range of from 5 to 7 m.e.v., detecting the prompt gamma radiation resulting from neutron bombardment, and recording in correlation with depth the intensity of the prompt gamma radiation having energies of about 4.4 m.e.v.

3. A system for logging earth formations which comprises a quantity of $_6C^{13}$ and a source of alpha rays of energies of about 5 m.e.v. for irradiating said quantity of $_6C^{13}$ to produce neutrons having a maximum intensity which falls within an energy band of from about 5 to 7 m.e.v., means for moving said source along a borehole to irradiate adjacent formations, a gamma radiation detector supported for movement with said source, and means connected to said detector including a recorder for recording the prompt gamma radiation resulting from such irradiation.

4. A system for logging earth formations which comprises a quantity of $_6C^{13}$ and a source of alpha rays of energies of about 5 m.e.v. for irradiating said quantity of $_6C^{13}$ to produce neutrons substantially confined to an energy band of from about 5 to 7 m.e.v., means for moving said source along a borehole to irradiate adjacent formations, a gamma radiation detector supported for movement with said source, and means connected to said detector including a recorder for recording the prompt gamma radiation resulting from such irradiation.

5. A system for logging earth formations which comprises a neutron source including a target material of $_6C^{13}$ and an alpha rayer of energies of about 5 m.e.v. for producing neutrons of energies of about 5 to 7 m.e.v., means for moving said source along a borehole to irradiate adjacent formations, a gamma radiation detector supported for movement with said source, and means connected to said detector including a recorder for recording the prompt gamma radiation resulting from such irradiation.

References Cited in the file of this patent

UNITED STATES PATENTS

| 2,275,748 | Fearon | Mar. 10, 1942 |
| 2,303,688 | Fearon | Dec. 1, 1942 |
| 2,752,504 | McKay | June 26, 1956 |

OTHER REFERENCES

Physical Society of London, Proceedings, vol. 66A, 1953, pages 1176, 1177.

UNITED STATES PATENT OFFICE
CERTIFICATION OF CORRECTION

Patent No. 2,963,582                                  December 6, 1960

Tom W. Bonner et al.

It is hereby certified that error appears in the above numbered patent requiring correction and that the said Letters Patent should read as corrected below.

Column 2, line 62, for "$_6C^{13}$" read --- $_6C^{12}$ ---.

Signed and sealed this 9th day of May 1961.

(SEAL)
Attest:

ERNEST W. SWIDER                                        DAVID L. LADD
Attesting Officer                                          Commissioner of Patents